United States Patent Office 3,584,052
Patented June 8, 1971

3,584,052
PROCESS FOR PREPARING ALKALI METAL DICHLOROPHENOL SULFONATES
Harvey Gurien, Maplewood, and Albert Israel Rachlin, Verona, N.J., assignors to Hoffmann-La Roche Inc., Nutley, N.J.
No Drawing. Filed Apr. 2, 1968, Ser. No. 718,228
Int. Cl. C07c 143/42
U.S. Cl. 260—512R                   5 Claims

ABSTRACT OF THE DISCLOSURE

A new and improved process of preparing an alkali metal dichlorophenol sulfonate from an alkali metal trichlorobenzenesulfonate utilizing dimethylsulfoxide as a solvent.

BACKGROUND OF THE INVENTION 2,3-dichlorophenol is an extremely valuable compound, since it finds uses as an important intermediate for various insecticides such as 2,3-dichlorophenyl-2-propargyl ether which is disclosed in U.S. Pat. No. 3,362,871—Fellig et al., Jan. 9, 1967.

In the past 2,3-dichlorophenol has been prepared from 1,2,3-trichlorobenzene by the procedure described by Z. Stota and O. Schiessel, Coll. Czech. Chem. Comm., 29, 1077 (1964). In this procedure, 1,2,3-trichlorobenzene is first reacted with oleum at temperatures of from 75° C. to 80° C. and thereafter reacted with an alkali metal chloride to form an alkali metal trichlorobenzene sulfonate. This alkali metal benzene sulfonate is then reacted with sodium hydroxide in an aqueous medium at a pressure of 410 p.s.i.g. and a temperature of about 220° C. to form an alkali metal 2,3-dichlorophenol sulfonate which is steam distilled with 70 percent by weight sulfuric acid to give 2,3-dichlorophenol.

A disadvantage in this process is that the conversion of the alkali metal trichlorobenzene sulfonate to the alkali metal dichlorophenol sulfonate takes place at superatmospheric pressures and at temperatures above 200° C. Therefore, this conversion has proven extremely costly. This is especially true since high pressure and temperature equipment must be utilized to effect this conversion.

SUMMARY OF THE INVENTION

In accordance with this invention, it has been found that when dimethylsulfoxide is utilized as a solvent in the reaction of a compound of the formula:

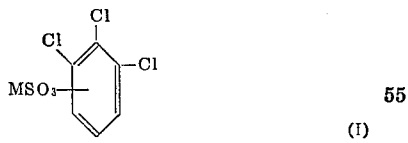

(I)

wherein M is an alkali metal with an alkali metal hydroxide, a compound of the formula:

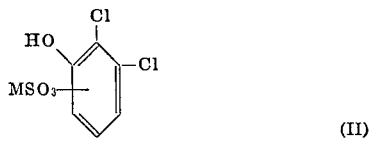

(II)

wherein M is an alkali metal hydroxide is formed without the necessity of utilizing superatmospheric pressure or temperatures of over 200° C. Therefore, by means of this invention, a process is provided for obtaining the compound of Formula II above by means of utilizing atmospheric pressure so that the use of high temperature and high pressure equipment such as an autoclave is avoided. Therefore, this invention provides a simple and economic means for effecting the conversion of compounds of the Formula I into compounds of the Formula II.

The process of this invention produces the compound of Formula II in high yields. A further advantage in utilizing dimethyl sulfoxide as the solvent in this reaction is that any unreacted starting material, i.e., the compound of Formula I, can be recovered from the reaction medium. This recovered starting material can then be reused in the process of this invention to produce the compound of Formula II.

DETAILED DESCRIPTION

The term alkali metal includes lithium, sodium and potassium with sodium and potassium being preferred.

In accordance with the present invention, the compound of Formula I is reacted with the alkali metal hydroxide in the presence of dimethylsulfoxide at a temperature of from about 100° C. to about 170° C. In carrying out this reaction, the alkali metal hydroxide and the compound of Formula I can be present in stoichiometric quantities. However, a slight excess of either reactant can be present in the reaction mixture. Generally, it is preferred to utilize from about 1 mole to 10 moles of alkali metal hydroxide per mole of the compound of Formula I above.

The dimethylsulfoxide should be utilized in this reaction in an amount at least sufficient to dissolve all of the compound of Formula I. Generally, it is preferred to utilize dimethylsulfoxide in an amount of at least 1.5 times the weight of the compound of Formula I in this reaction. Large excesses of the dimethylsulfoxide, i.e., an amount of 30 times the weight of the compound of Formula I or greater, can be utilized without deleteriously affecting the reaction.

In carrying out this reaction, water should be present in the reaction medium. The water should be present in an amount of from about 0.5 mole to 5.0 moles per mole of sodium hydroxide. While it is preferable to carry out this reaction at temperatures of from about 100 to 170° C. and atmospheric pressure, higher temperatures and elevated pressures can be utilized. However, since these elevated pressures produce no additional beneficial results in this reaction, there is no need to utilize high temperatures and elevated pressures in accordance with the process of this invention.

The following examples further illustrate the invention. All temperatures stated are in degrees centigrade.

EXAMPLE 1

Preparation of dichlorophenol sulfonate by means of pressure and use of an autoclave Into a 3.5 liter steel autoclave was placed 1600 ml. of water, 350 g. of sodium hydroxide (8.76 moles) and 1 kg. of a mixture consisting of sodium 2,3,4-trichlorobenzene sulfonate and sodium 3,4,5-trichlorobenzene sulfonate. An overpressure of 50 lbs. of nitrogen was applied, and the mixture was heated to 220° and held at this temperature for one hour. The internal pressure reached 410 lbs. per square inch gauge.

Upon cooling to 30°, the reactor was discharged and washed with 1 liter of water. The combined contents and washes were filtered to remove insoluble material. The initial filtrate, which was removed by filtration, was acidified with 260 ml. of acetic acid, cooled to 10° and filtered. The solid which was dried in vacuo at 60–70°, weighed 563.2 g. (60.4 percent of theory). This product was dichlorophenol sulfonate.

Concentration of the initial acetic acid filtrate gave 96.2 g. of a material from which no pure sodium trichlorobenzene sulfonate could be recovered.

EXAMPLE 2

Into a 125 ml. of flask equipped with stirrer, thermometer and reflux condenser, under nitrogen, was placed 25.0 g. (0.088 mole) of a mixture consisting of sodium 2,3,4-trichlorobenzene sulfonate and sodium 3,4,5-trichlorobenzene sulfonate, 50 ml. of dimethyl sulfoxide, 2.5 ml. of water and 8.8 g. of solid sodium hydroxide (0.22 mole). The reaction mixture was allowed to reflux for 3.5 hours at a solution temperatrue of 146°. Upon cooling to room temperature, the mixture was filtered and washed with a 10 ml. portion of dimethylsulfoxide. The presscake was dissolved in 60 ml. of water, filtered and acidified with 7 ml. of acetic acid. After cooling to 5–10°, the solid was filtered and dried in vacuum at 25°, to give 10.0 g. of dichlorophenol sulfonate as product. Concentration of the aqueous filtrate to near dryness and filtration gave an additional 5.1 g. of product. The total yield of product was 15.1 g. (64.5 percent of theory).

The dimethyl sulfoxide filtrate was concentrated to dryness. The residue was taken up in 40 ml. of boiling water and the solution was acidified to pH 5 with acetic acid while still hot and allowed to cool to room temperature. Upon filtration and drying in vacuum, the solid weighed 2.9 g. It was shown to be sodium trichlorobenezne sulfonate.

EXAMPLE 3

Preparation of 2,3-dichlorophenol

Into a 12 liter 3-neck flask equipped for steam distillation was placed 3.23 liters of an aqueous solution containing 70 percent by weight sulfuric acid, and 652.8 g. of the sodium dichlorophenol sulfonate prepared in Example 2. After preheating to 130°, steam was introduced into the flask and steam distillation was continued until the distillate gave a negative ferric chloride test. About 2 liters of distillate was collected. The aqueous distillate was cooled to 10–15° and filtered.

The solid obtained was dried in vacuum at room temperature, and gave 309.0 g., of 2,3-dichlorophenol.

We claim:

1. A process for preparing a phenol compound of the formula:

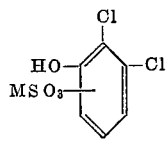

wherein M is an alkali metal comprising reacting at a temperature of at least 100° C. a compound of the formula:

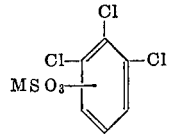

wherein M is as above with an alkali metal hydroxide in the presence of water in an amount of from about 0.5 mole to about 5.0 moles per mole of said alkali metal hydroxide utilizing dimethyl sulfoxide as the solvent medium.

2. The process of claim 1, wherein said alkali metal hydroxide sodium hydroxide.

3. The process of claim 1, wherein the temperature of said reaction is from 100° C. to 170° C.

4. A process for preparing a phenol compound of the formula:

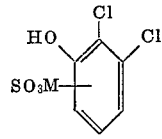

wherein M is an alkali metal comprising reacting at a temperature of from about 100° C. to 170° C. a trichloro compound of the formula:

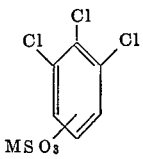

wherein M is an alkali metal with an alkali metal hydroxide, wherein said alkali metal hydroxide is present in an amount of from about 1 mole to 10 moles per mole of said trichloro compound, said reaction taking place in dimethyl sulfoxide as the solvent medium and in the presence of water in an amount of from 0.5 mole to about 5 moles per mole of said alkali metal hydroxide.

5. The process of claim 4, wherein said alkali metal hydroxide is sodium hydroxide.

References Cited

UNITED STATES PATENTS

| | | | |
|---|---|---|---|
| 604,066 | 5/1898 | Monnet | 260—512 |
| 2,835,707 | 5/1958 | Stoesser et al. | 260—512 |

DANIEL D. HORWITZ, Primary Examiner